UNITED STATES PATENT OFFICE.

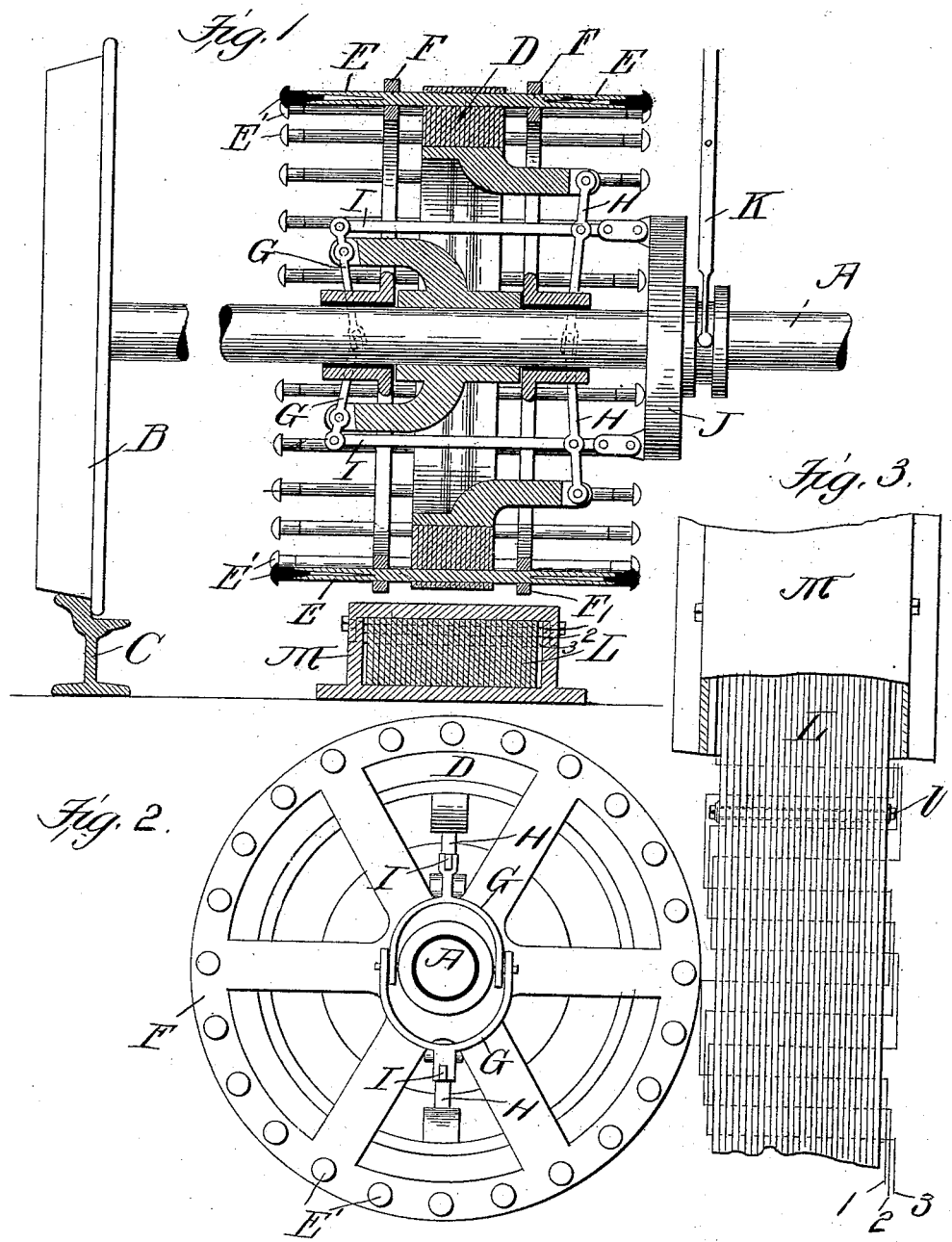

PHILIP K. STERN, OF ST. LOUIS, MISSOURI, ASSIGNOR OF ONE-HALF TO H. W. KIRCHNER, OF SAME PLACE.

SYSTEM OF ELECTRICAL TRANSPORTATION.

SPECIFICATION forming part of Letters Patent No. 559,872, dated May 12, 1896.

Application filed September 16, 1895. Serial No. 562,641. (No model.)

*To all whom it may concern:*

Be it known that I, PHILIP K. STERN, a citizen of the United States, residing at the city of St. Louis, State of Missouri, have invented a certain new and useful Improvement in a System of Electrical Transportation, of which the following is a full, clear, and exact description, reference being had to the accompanying drawings, forming a part of this specification, wherein—

Figure 1 is a sectional view through a car-axle and wheel upon which is mounted the motor element of my improved system, the primary or influencing means being shown in cross-section. Fig. 2 is a side elevational view of the motor element, and Fig. 3 is a schematic view of the primary element.

This invention relates to a new and useful improvement in a system of electrical transportation; and it consists, generally stated, in arranging along a route or line of travel a primary coil or coils, which are energized by an undulatory or pulsatory current, preferably in the form of a polyphase current, which influences the armature or motor element mounted on the vehicle, which vehicle is adapted to travel along said route or line of travel. The passage of the aforementioned undulatory or pulsatory current through the primary coils sets up a magnetic field, which, by the nature of the current and the electrical connection, is constantly changing both in intensity and direction. The field thus set up acts by induction upon the motor element or armature carried by the vehicle, causing said armature or motor element to rotate and thus propel the vehicle.

It further consists in providing means whereby the secondary or induced currents of the armature or secondary coils may be short-circuited or closed to control the rotation of the motor element, and, finally, in the construction, arrangement, and combination of the several parts, all as will hereinafter be described, and afterward pointed out in the claims.

In the drawings I have shown my improved system as adapted to be used in connection with a car or other vehicle designed to run along a given route of travel or on rails. I desire to be understood, however, as not confining myself to the exact construction shown in the drawings, either in the manner of mounting the motor element or the means for varying the resistance of the induced-current conductors, as there are different ways by which this can be accomplished.

Referring to the drawings, A indicates a car-axle, B the wheel, and C the rail, all of such parts being of ordinary or approved construction.

Mounted upon the axle is the motor element of my improved system, comprising a laminated wheel D, the laminations of which are traversed by induced-current conductors E, preferably located near the periphery of said wheel. In order to vary the electrical resistance of these induced-current conductors, I prefer to vary the thickness or cross-section of the same near their ends, which ends extend out beyond the laminated wheel D. Slidingly mounted on these induced-current conductors and arranged on each side of wheel D are the short-circuiting conductors or short-circuiting rings F, which are preferably provided with a hub portion, slidingly mounted on axle A. To move these rings F toward and from the wheel D, in order to vary the resistance of the induced or secondary circuit, I pivot on suitable projections extending from wheel D levers G and H, whose ends are forked and embrace the hub portion of rings F, to which they are connected by the slot-and-pin connection. These arms G and H are in the form of first and second class levers, to the power-points of which are connected operating-rods I, the ends of said rods being connected by links to a sliding disk J feathered on the axle, which disk is slid along said axle by means of a lever K, pivoted to some stationary part of the car-body, which body is not shown. In this manner, by the adjustment of the short-circuiting ring F, the resistance of the induced-current-conducting bars E may be varied and the speed of this motor element thus controlled. To prevent the rings F sliding off the bars E, I prefer to arrange insulating-buttons E' in the ends thereof, which buttons have a shank of sufficient length to afford a seat for the rings F, whereby when said rings are moved to the utmost extremities they will rest on these insulation-buttons, not contacting with the bar E, thus completely opening the circuit and rendering the motor element inoperative.

The primary, along which is propagated a succession of polar waves to influence this motor element by induction, consists, preferably, of a core L of laminated material, the laminations of which are longitudinally disposed. These laminations are preferably insulated from each other and also from the conductors carrying the polyphase currents, which are wound around or passed through said core.

In Fig. 3 I have shown a system of winding in which 1, 2, and 3 indicate conducting-wires for a tri-phase current, which wires are wound or arranged in a zigzag form through suitable perforations near the upper edge of the core. These conductors are connected with suitable source of electricity generating a three-phase alternating current. By this arrangement the phases, having a relation of one hundred and twenty degrees apart, set up a magnetic field of alternate north and south poles, which embrace or include the motor element on the axle of the vehicle, inducing secondary currents in the bars E, which are short-circuited by the rings F, thereby producing a torque on the wheel, which causes the same to rotate.

To prevent short-circuiting of the conductors 1, 2, and 3, I prefer to surround the same and the primary core with a casing or shell M of some insulation material—such as porcelain, vulcanized rubber, or the like—which not only keeps out moisture and water, but which prevents abrasion of the laminations of which the primary core is composed. This casing is divided to admit of the insertion of the core, the several portions of the casing being secured together by screws or other suitable means.

In the form of winding shown the laminations of the core will be held together by the winding; but if some other forms of winding are employed an insulated through-bolt could be used, as shown.

I am aware that many minor changes in the construction, arrangement, and combination of the several parts of my device can be made and substituted for those herein shown and described without in the least departing from the nature and principle of my invention.

Having thus described my invention, what I claim, and desire to secure by Letters Patent of the United States, is—

1. An electric transportation system, consisting of a route or line of travel, a vehicle which is adapted to travel along said route, a primary inducing element, which is arranged along said route, and a laminated wheel, mounted on said vehicle, which wheel is influenced by the primary element, substantially as described.

2. An electric transportation system, consisting of a route or line of travel, a vehicle adapted to travel along said route, a primary inducing element arranged along the route, a laminated wheel, mounted on the vehicle and induced-current conductors on said wheel, substantially as described.

3. The combination with a suitable axle, of an iron wheel mounted thereon, induced-current conductors on said wheel, a primary inducing element which is arranged in proximity to said wheel, said element, when energized, by alternating currents of different phases, generating alternate varying polarities, whereby the wheel is caused to rotate by induction, and means on the wheel for varying the resistance of the induced-current conductors on said wheel, substantially as described.

4. The combination with a primary element, which is energized by alternating currents of different phases, of a wheel mounted in proximity thereto, which wheel is rotated by induction, induced-current conductors of varying resistance on said wheel, and means for short-circuiting or varying the resistance of said induced-current conductors whereby the movement of the wheel is controlled, substantially as described.

5. The combination with a primary element, which is energized by alternating currents of different phases, of a laminated-iron wheel located in proximity thereto, which wheel is rotated by induction, induced-current conductors on said wheel, a metallic ring or rings slidingly mounted upon said conductors for the induced currents, substantially as described.

6. The combination with a core, composed of a series of laminations, insulated from each other, electrical conductors on said core, for conducting a polyphase current, said conductors when energized forming a primary element, a wheel which is mounted in proximity to said element, induced-current conductors in said wheel, whose resistance increases toward their ends, and a ring slidingly mounted on said conductors for varying the resistance of the induced currents, substantially as described.

7. A wheel which is adapted to be rotated by induced currents, said wheel comprising a laminated ring, mounted upon a suitable shaft or axle, induced-current conductors which are carried by said wheel, said conductors projecting laterally outside of said wheel, which conductors are so arranged that their conductivity decreases toward their ends, and a ring or rings slidingly mounted upon said conductors for short-circuiting the induced currents.

8. A wheel, which is adapted to be rotated by induced currents, said wheel comprising laminated rings, induced-current conductors which are carried by said ring, and which project laterally from said ring, a ring or rings for varying the resistance of said conductors, said ring being slidingly mounted on the conductors, and insulation-buttons in the ends of the conductors, for limiting the movement of the rings, said insulations also affording a seat for the rings, where said rings are out of contact with the induced-current conductors, substantially as described.

9. In a system of electrical transportation, the combination with a vehicle, which is adapted to travel along a route or line of travel, a primary element which is arranged along the said route, a secondary rotatory inducing member, which is carried by said vehicle, and in inductive relationship to said primary element, said secondary member being adapted to propel the vehicle, and means for varying the torque of said secondary member, substantially as described.

In testimony whereof I hereunto affix my signature, in presence of two witnesses, this 11th day of September, 1895.

PHILIP K. STERN.

Witnesses:
F. R. CORNWALL,
HUGH K. WAGNER.